US011922461B2

(12) United States Patent
Greenough et al.

(10) Patent No.: US 11,922,461 B2
(45) Date of Patent: *Mar. 5, 2024

(54) METHOD AND SYSTEM FOR MATCHING PURCHASE TRANSACTION HISTORY TO REAL-TIME LOCATION INFORMATION

(71) Applicant: Capital One Services, LLC, McLean, VA (US)

(72) Inventors: Joshua M. Greenough, San Francisco, CA (US); Cameron M. Geiser, San Francisco, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,767

(22) Filed: May 9, 2023

(65) Prior Publication Data
US 2023/0274315 A1   Aug. 31, 2023

Related U.S. Application Data

(63) Continuation of application No. 17/394,915, filed on Aug. 5, 2021, now Pat. No. 11,687,970, which is a continuation of application No. 16/157,491, filed on Oct. 11, 2018, now Pat. No. 11,120,474, which is a continuation of application No. 13/103,855, filed on May 9, 2011, now Pat. No. 10,127,578.

(51) Int. Cl.
G06Q 30/0251 (2023.01)
G06Q 20/32 (2012.01)

(52) U.S. Cl.
CPC ..... *G06Q 30/0261* (2013.01); *G06Q 20/3224* (2013.01)

(58) Field of Classification Search
CPC .............. G06Q 30/0261; G06Q 20/3224
See application file for complete search history.

(56) References Cited

U.S. PATENT DOCUMENTS

| 6,332,126 B1 | 12/2001 | Peirce et al. |
| 7,124,092 B2 | 10/2006 | O'Toole, Jr. et al. |
| 7,165,037 B2 | 1/2007 | Lazarus et al. |

(Continued)

OTHER PUBLICATIONS

The Customized Store, pp. 125-147, Turow, MIT Press, ISBN,9780262257114, 2008.*

(Continued)

*Primary Examiner* — Michael I Ezewoko
(74) *Attorney, Agent, or Firm* — TROUTMAN PEPPER HAMILTON SANDERS LLP; Christopher J. Forstner; John A. Morrissett

(57) ABSTRACT

Embodiments are described for a system and method for providing a list of current offers from retailers to a user operating a mobile client device. Aspects of the method comprise analyzing a transaction history of the user to identify a vendor who has transacted with the user; determining a present geographic location of the user based on a location of the mobile client device; determining a location of the vendor proximate the user based on the transaction history and the present geographic location of the user; searching for a current promotion offered by the vendor; and facilitating the serving of the current promotion to the user through the mobile client device.

20 Claims, 12 Drawing Sheets

(56) References Cited

U.S. PATENT DOCUMENTS

| | | | |
|---|---|---|---|
| 7,418,402 B2 | 8/2008 | McCrossin et al. | |
| 7,840,427 B2 * | 11/2010 | O'Sullivan | G06Q 10/00 340/988 |
| 8,103,545 B2 | 1/2012 | Ramer et al. | |
| 8,260,634 B1 | 9/2012 | Lawlor | |
| 8,463,772 B1 * | 6/2013 | Aminzade | G06F 16/9537 707/723 |
| 8,583,511 B2 * | 11/2013 | Hendrickson | H04L 67/52 705/14.65 |
| 9,277,360 B2 * | 3/2016 | Fay | G06Q 30/0261 |
| 9,584,993 B2 * | 2/2017 | Johnson | H04W 4/14 |
| 9,646,325 B2 * | 5/2017 | DeWitt | H04L 67/02 |
| 10,275,784 B2 * | 4/2019 | Thomas | G06Q 30/02 |
| 10,438,240 B1 | 10/2019 | Ehrlacher et al. | |
| 10,939,229 B2 * | 3/2021 | Deluca | H04W 4/027 |
| 11,120,474 B2 * | 9/2021 | Greenough | G06Q 20/3224 |
| 11,210,705 B1 * | 12/2021 | Paterson | G06Q 30/0267 |
| 11,432,102 B2 * | 8/2022 | Ellis | H04W 4/021 |
| 11,687,970 B2 * | 6/2023 | Greenough | G06Q 20/3224 705/14.53 |
| 2002/0107027 A1 | 8/2002 | O'Neil | |
| 2002/0138349 A1 | 9/2002 | Platt | |
| 2002/0165009 A1 | 11/2002 | Nohara et al. | |
| 2003/0158844 A1 | 8/2003 | Kramer et al. | |
| 2003/0216960 A1 | 11/2003 | Postrel | |
| 2004/0073482 A1 | 4/2004 | Wiggins et al. | |
| 2004/0215476 A1 | 10/2004 | Harvey et al. | |
| 2006/0129534 A1 | 6/2006 | Jones et al. | |
| 2007/0162226 A1 | 7/2007 | Chen | |
| 2007/0208618 A1 | 9/2007 | Paintin et al. | |
| 2008/0027810 A1 | 1/2008 | Lerner et al. | |
| 2008/0065490 A1 | 3/2008 | Novick et al. | |
| 2008/0140520 A1 | 6/2008 | Hyder et al. | |
| 2008/0221983 A1 | 9/2008 | Ausiannik et al. | |
| 2008/0262928 A1 | 10/2008 | Michaelis | |
| 2008/0268868 A1 | 10/2008 | Maitland | |
| 2009/0052784 A1 * | 2/2009 | Covell | G06F 16/783 382/209 |
| 2009/0157512 A1 | 6/2009 | King | |
| 2009/0228325 A1 | 9/2009 | Simmons et al. | |
| 2009/0327151 A1 | 12/2009 | Carlson et al. | |
| 2010/0011081 A1 | 1/2010 | Crowley et al. | |
| 2010/0077017 A1 * | 3/2010 | Martinez | H04W 4/02 709/201 |
| 2010/0145918 A1 | 6/2010 | Stata et al. | |
| 2010/0191746 A1 | 7/2010 | Wang et al. | |
| 2010/0276484 A1 | 11/2010 | Banerjee et al. | |
| 2011/0022628 A1 | 1/2011 | Kramer et al. | |
| 2011/0029363 A1 | 2/2011 | Gillenson et al. | |
| 2011/0153192 A1 | 6/2011 | Lin | |
| 2011/0208575 A1 | 8/2011 | Bansal et al. | |
| 2011/0218855 A1 | 9/2011 | Cao et al. | |
| 2011/0238476 A1 | 9/2011 | Carr et al. | |
| 2011/0238517 A1 | 9/2011 | Ramalingam et al. | |
| 2011/0246304 A1 * | 10/2011 | Hicks | G06Q 30/0261 705/14.58 |
| 2011/0264646 A1 | 10/2011 | Sokolan et al. | |
| 2011/0275354 A1 | 11/2011 | Akhter | |
| 2012/0059713 A1 * | 3/2012 | Galas | G06Q 30/0241 705/14.49 |
| 2012/0303425 A1 | 11/2012 | Katzin et al. | |
| 2013/0073389 A1 * | 3/2013 | Heath | G06Q 30/02 705/14.54 |
| 2013/0138741 A1 * | 5/2013 | Redstone | H04W 4/029 709/204 |
| 2016/0345127 A1 * | 11/2016 | DeWitt | H04W 4/021 |
| 2016/0345148 A1 * | 11/2016 | Johnson | H04W 4/14 |
| 2018/0350144 A1 * | 12/2018 | Rathod | G06Q 20/3224 |
| 2020/0100052 A1 * | 3/2020 | Ellis | H04L 67/55 |
| 2021/0365987 A1 * | 11/2021 | Greenough | G06Q 30/0261 |
| 2023/0048004 A1 * | 2/2023 | Ellis | H04W 4/023 |
| 2023/0274315 A1 * | 8/2023 | Greenough | G06Q 30/0261 705/14.53 |

OTHER PUBLICATIONS

Wang, IEEE, pp. 315-323.*
Will, IEEE, 2010, sections I-VII.*

* cited by examiner

METHOD AND SYSTEM FOR MATCHING PURCHASE TRANSACTION HISTORY TO REAL-TIME LOCATION INFORMATION

CROSS REFERENCE TO RELATED APPLICATIONS

This application is a continuation of, and claims priority under 35 U.S.C. § 120 to, U.S. patent application Ser. No. 17/394,915, filed Aug. 5, 2021, which is a continuation of U.S. patent application Ser. No. 16/157,491, now U.S. Pat. No. 11,120,474, filed Oct. 11, 2018, which is a continuation of U.S. patent application Ser. No. 13/103,855, now U.S. Pat. No. 10,127,578, filed May 9, 2011, the entire contents of each of which are hereby incorporated by reference in their entireties as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to electronic commerce, and more specifically to matching credit and/or debit transactions to real-time location information through location-aware mobile devices.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The advent of social networking systems and advanced mobile devices has facilitated the distribution and use of electronic coupons for use in both electronic commerce (e-commerce) and standard retail environments. Coupons are widely used by businesses to promote goods and services, increase sales by attracting new customers and retaining existing customers, and expand brand awareness through wide distribution. Coupons are increasingly being distributed in electronic form by capitalizing on the capabilities of current mobile devices and the broad installed base of smartphone and mobile device users. This allows retailers and companies to transmit coupons directly to potentially interested customers without relying on traditional distribution methods in which these customers to seek out and find the coupons themselves.

Present methods of electronic coupon distribution are limited in that they do not always provide sufficiently focused targeting of appropriate customers. The incorporation of location-based capabilities in mobile devices has allowed some degree of targeting based on a user's location. However, these methods effectively filter distribution of coupons and ad messages only on the basis of where a person lives and/or where the person is located at a particular moment. They generally do not provide an adequate correlation in terms of particular goods or services that the person might actually be interested in purchasing. Though this is considered to be "targeted" by some, these present methods actually continue to result in a relatively unfocused targeting of coupon and ad messages; thus creating the potential negative effect of bombarding or oversaturating the customer with useless messages. The ability of users to filter or block certain messages exacerbates this problem, as effect of annoying or oversaturating a customer may lead to the user blocking all classes of messages relating to e-commerce solicitations, including both useful and useless coupons. This can thus negate any benefit of distributing coupons electronically, even to an ostensibly targeted population, such as based solely on location.

What is needed therefore, is an electronic coupon and ad message delivery system that provides further effective targeting of potential customers based on actual proven customer interest.

BRIEF SUMMARY

Embodiments are generally directed to transmitting electronic coupons, offers, or similar ad messages to users through mobile devices based on a location of the user and his or her past transaction history with one or more vendors within an immediate proximity of the user. In general, a method and associated computing system for providing a list of current offers from retailers to a user operating a mobile client device comprises analyzing a transaction history of the user to identify a vendor who has transacted with the user, determining a present geographic location of the user based on a location of the mobile client device, determining a location of the vendor proximate the user based on the transaction history and the present geographic location of the user; searching for a current promotion offered by the vendor, and facilitating the serving of the current promotion message to the user through the mobile client device.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Systems and methods are described for delivering coupons and ad messages to a user through a wireless communications network and a location-aware mobile device based on a user's immediate location and past commercial transaction history with retailers in the vicinity of the user. Aspects of the one or more embodiments described herein may be implemented on one or more computers executing software instructions. The computers may be networked in a client-server arrangement or similar distributed computer network, and one or more of the networked computers may host web pages that are accessed by one or more client computers through web browser programs.

Figure 1:
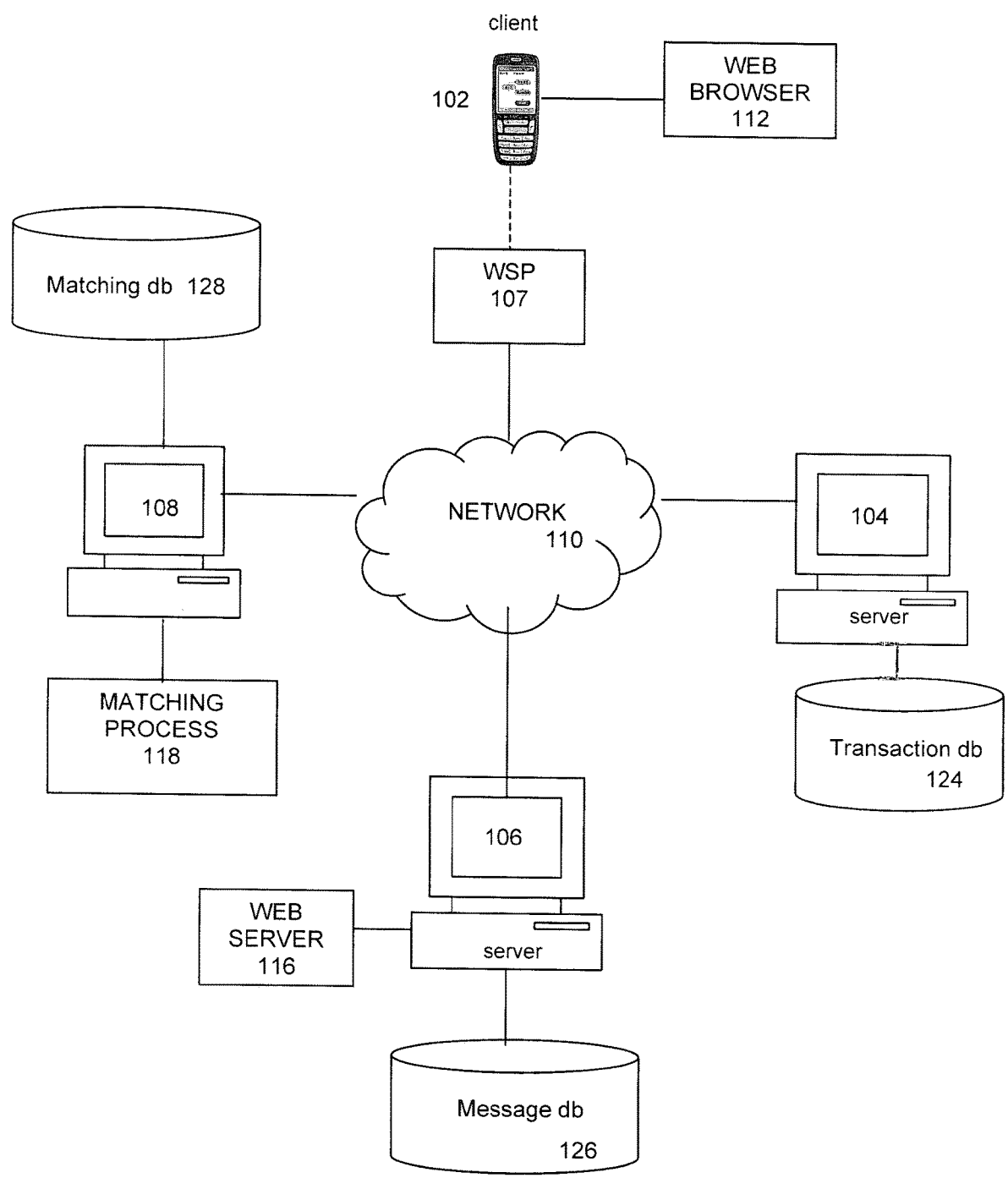
FIG. 1 illustrates a computer network system 100 that implements one or more embodiments of an electronic coupon matching and distribution method.

FIG. 1 illustrates a computer network system 100 that implements one or more embodiments. In system 100, a mobile client device 102 is coupled to network 110 through a wireless service provider (WSP) 107. In an embodiment, the client device 102 is typically a smart phone or similar mobile device that has communication capabilities through phone or radio services provided by WSP 107, as well as web browsing capabilities through a web browser program 112. Client 102 is typically embodied within a portable or wireless access device, such as a smartphone 118, tablet device, personal digital assistant (PDA) or similar mobile communication device. Alternatively, client 102 may be a client computer, such as a laptop, notebook, netbook, or even a personal or workstation computer. The client device 102 is also assumed to have certain location-aware (geo-enabled) functionality so that the geographic location of the device 102 can be determined, either by onboard GPS circuitry or by capabilities provided by the WSP 107 or other service providers.

As shown in FIG. 1, one or more server computers are also coupled to the network 110. These server computers are operated by various entities and provide data to be processed and/or used by client 102. The server computers may each be implemented within any suitable networkable computing device, such as server-class computers, workstations, personal computers, or any similar device capable of hosting applications accessed over network 110. The network interface between server computers 104, 106, and 108 and the client 102 may include one or more routers (not shown) that serve to buffer and route the data transmitted between the server and client computers. Network 110 may be the Internet, a Wide Area Network (WAN), a Local Area Network (LAN), or any combination thereof. For embodiments in which network 110 is the Internet, the client computers may access server computers and other resources on the network through an Internet Service Provider (ISP) that provides account and access resources for the client computers.

In a typical implementation, one or more of the server computers 104, 106, and 108 may be a World-Wide Web (WWW) server that stores data in the form of web pages and transmits these pages as Hypertext Markup Language (HTML) files over the Internet 110 to client device 102. In a web-based network in which network 110 is the Internet, a network server, e.g., server 106 executes a web server process 116 to provide HTML documents, typically in the form of web pages, to client computers coupled to the network. To access the HTML files provided by server 106, client device or computer 102 executes a web browser process 112 to access web pages available on server 106 and other Internet server sites, such as other content providers.

In an example electronic commerce application, server 106 ("vendor server") can represent a server computer maintained by a business or entity (vendor) that provides goods or services that are at least partially advertised or provided electronically through network 110. Various aspects of these goods and services, such as ad messages, coupons, and other electronic information may be stored in a data store 126 that is coupled to server 106. Such information may include time-sensitive information related to current offers, sales, discounts, and so on, and may be provided on a real-time basis through web content served by web server process 116 by server 106. Server 106 thus represents a content provider that may be deployed by a retailer, advertiser, broker, store, commercial company, or any entity providing goods or services through network 110. For purposes of the present description, the terms "vendor," "retailer," "store," and "content provider," are used interchangeably to mean an entity, individual or company that maintains a server 106 to provide goods and/or services and advertisements, coupons or other messages in electronic form to promote those goods or services. The promotional messages can be provided in various different embodiments, such as redeemable coupons, ad messages, flyers, links to subscription or registration pages, and other similar messages. Such messages are typically provided in electronic rather than paper or hardcopy format, for display and access through the user's mobile client device 102. The content of these messages, such as image content, hyperlinks, program scripts, and so on, are stored in a message database in a datastore 126 that is coupled to or accessible by the vendor server 106. The terms "coupon" or "ad" may be used interchangeably to refer to any type of promotional message served by the vendor server 106 to the user client device 102.

In an embodiment, a user of client device 102 is assumed to maintain one or more commercial accounts for saving or accessing money. Such accounts can be bank saving or checking accounts, credit card accounts, debit card accounts, and other similar financial accounts. Such accounts can be managed through electronic means including communication and interface means implemented for network 110. Examples include online banking and electronic credit/debit card account management services. Server (payment server) 104 represents a transaction manager server computer that maintains one or more electronic commerce accounts for the user of client device 102. Payment server 104 may be a bank server computer or a server maintained by a credit or debit card company, or other payments platform. Account and transaction information for the user is typically stored in one or more transaction databases within a datastore 124 coupled to payment server 104. Payment server 104 may be maintained by a company that provides account aggregation services and other online financial services. Such services, such as that provided by Yodlee™ allows users to see their credit card, bank, investment, email, travel reward accounts, and other similar transactions on one screen. In one embodiment, the only transactions in transaction database 124 that are utilized by system 100 are card-based transactions, that is, credit and/or debit card transactions.

For the embodiment of FIG. 1, system 100 also includes a server computer (matching server) 108 that executes a matching process 118. The matching process 118 comprises one or more matching algorithms, circuitry or software programs that perform various matching functions including: (1) matching retailers to user transaction history, (2) matching these retailers to a current location, (3) matching current user location to matched retailers, and (4) matching current offers to matched retailers. These matching algorithms may be packaged as a single matching process or combined into two or more separate methods within the process 118. In general, the matching process 118 matches a user's past transaction history with one or more vendors to a present location of the user and any current offers by those vendors who are in the vicinity of the user to serve relevant coupons or ads to the user. The matching process 118 analyzes information related to a user's past transaction history with regard to one or more vendors in order to match current offers provided by these vendors (through server 106) who are within a certain distance of the current location of the user as determined by the location-aware capabilities of client device 102. In this manner, the user is provided with timely coupons or ad messages from vendors who are within a close proximity to the user, and with whom the user has a past transaction history. This ostensibly limits the transmission of solicitations to users who have a proven or bona fide interest in receiving these messages.

Figure 2:
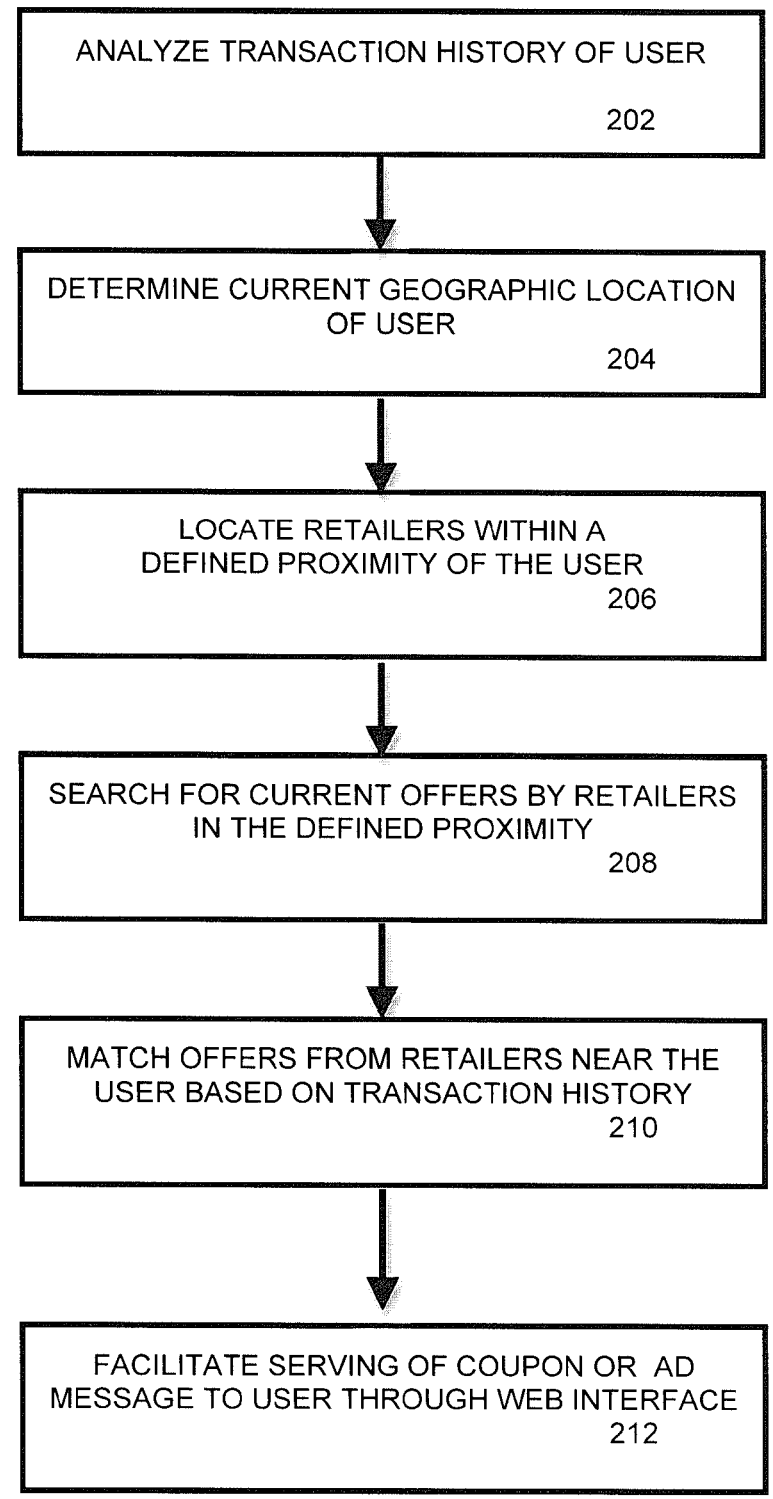
FIG. 2 is a flowchart that illustrates a method of matching current offers by retailers to users who are within the vicinity of these retailers and who have a transaction history with these retailers.

FIG. 2 is a flowchart that illustrates a method of matching current offers by retailers to users who are within the vicinity of these retailers and have done business with these retailers in the past. It should be noted that the order of process elements shown in FIG. 2 is not strictly limited to the order shown in FIG. 2. One or more of the method acts may be performed in a different order relative to the other For example, the analyzing the transaction history of the user, block 202 may be performed prior to or simultaneously with the act of determining a location of the user, block 204. Furthermore, the illustrated method elements are not necessarily strictly independent or unitary method steps. One or more of the illustrated elements (steps) may be combined with one or more of the other elements. Likewise, one or more of the illustrated method elements may be separated into one or more constituent sub-elements or sub-steps. These steps and sub-steps may be performed by the same or different hardware components and software processes, such as those shown in FIG. 1.

As shown in FIG. 2, the transaction history of the user is analyzed to determine particular vendors, retailers, or companies that the user has done business with in the past, block 202. Such transactions can include purchases made by credit or debit card, electronic check, online transactions, or other electronically tracked or accessible means. Such transactions may also be made through one or more mobile payment schemes, such as mobile payments enabled by Near Field Communications (NFC) technology in which payments are processed through a communications-based network that allows users to make mobile payments by placing a radio-microchip-enabled device (e.g., an NFC-enabled smartphone) proximate a corresponding point-of-sale (POS) terminal at a retailer. Other implementations include devices or payment cards that incorporate RFID (radio-frequency ID) chips to use in conjunction with appropriate POS terminals.

In an embodiment, the transaction information is obtained by accessing one or more accounts held by the user in credit/debit card, bank, or merchant sites. Such sites may be maintained by a transaction server computer 104 and accessed by matching process server 108 over the network 110. In general, account access permissions must be provided to an administrator of the matching process server 108 so that relevant account information from database 124 can be accessed by the server 108. One or more account provisioning and security methods, such as those known in the art may be implemented to ensure that the proprietary account information of the user is kept secure and accessible only to the authorized administrator personnel. For example, the administrator of matching server 108 may be required to use actual user credentials or explicit permissions to access the user information maintained by payment server 104.

The analysis of the transaction history (block 202) provides the names of vendors with whom the user has transacted business. Usually these business names are provided in readily identifiable, such as the full recognizable name of known businesses or retailers. Occasionally, the payments platforms may use mnemonics or codes to identify the retailers. In this case, a separate mapping database may need to be used to determine the proper name of a retailer. In an embodiment, the transaction analysis block 202 is performed on a periodic basis by the matching server 108 by accessing the payment server, such as on a weekly or monthly period. As such, this is considered an off-line process that is performed periodically by the system. Data relating to the transactions involving relevant retailers may be pulled from the payment platform transaction database 124 and stored locally on the matching process server computer 108.

The matching portion of process 200 starts by determining the current location of the user through the location-aware capabilities of the user's mobile client device 102. Real-time geographic location of the device may be provided by GPS (global positioning system) circuitry resident on the device or through geo-location techniques implemented by the wireless or Internet service providers, such techniques can include cell site triangulation, and similar methods. The location information is initiated by the client device and may be provided in the form of latitude-longitude (lat-long) data, street address data, or other geographic location format. The instantaneous location information is transmitted by the client device 102 to the matching process server computer 108. In one embodiment, matching server 108 may maintain a geographic lookup database to match lat-long data corresponding street address or physical location information to determine the physical location of the user. Alternatively, a third-party service may be used to determine the physical location of the user through the raw location data provided by the client device 102, and then transmitted to the matching server 108. The location information of the user is used by the process to pull a "places" list of locations of retailers who are in the vicinity of the user based on previous transactions of the user with these retailers.

As shown in block 202, the transaction history of the user provides the names of retailers with whom the user has previously done business. In general, some retailers are unique to a particular location, while many others may have a variety of locations distributed around a region (e.g., chain stores, gas stations, cafes, etc.). The transaction data obtained in block 202 is typically devoid of any particular location information. Thus, in an embodiment, the matching process 118 determines the location of retailers on the user's transaction list to find out whether any these retailers within the current proximity of the user, block 206. The matching process may utilize third party mapping or directory software to list all of the possible addresses of these retailers. These addresses are typically provided as street address data, so the matching process 118 converts this address data to lat-long or GPS coordinate data for purposes of comparison with the current user location derived in block 204. This provides a basis of comparing the current location of the user with any retailers who are close to the user and with whom user has previously visited or used. The distance of this relevant proximity is pre-defined and can be on the order of feet, miles, city blocks, or any other appropriate distance depending on system constraints and environmental conditions. For example, if the user is on foot in a crowded urban or downtown area, the defined proximity may be one or two blocks; whereas if the user is driving or traveling in a remote area, the defined proximity may be one order of a few miles. The defined proximity may be a static metric, or it may be dynamic based on the location of the user, his motion characteristics, time of day, and other variables.

As shown in process 200, the matching process 118 searches for any current offers provided by retailers who are on the transaction list and who are within the defined proximity of the user, block 208. Such offers may be embodied within redeemable coupons provided by the retailer or ad messages that provide an incentive for a customer to visit the retailer. If any appropriate offers are found, the matching process 118 then matches the offers or associated messages (e.g., ad messages) to the retailers through the transaction list, block 210. This establishes a link between current offers by retailers who are close to the user (i.e., within the defined proximity) and with whom the user has previously done business through a prior transaction. Once such a match is made, the retailer can then send the user a coupon or ad message for display on the client device 102. The matching process 118, or other process executed by matching server 108 may include one or more components that facilitate the serving of the coupon or message from the retailer to the user, block 212. Since the user and retailer are relatively close by one another, the user can then visit the retailer and redeem the coupon or otherwise act on the served message.

The matching process 118 effectively matches prior credit or debit transactions of the user with descriptions provided by payment platforms of retailers near a user location and offers provided by those retailers. A matching database 128 maintained by the matching server 108 may be used to stores each valid match as a matched transaction to a location. The matching server 108 also maintains a list of aliases (synonyms for locations) and a list of false positives for use in locating the retailers who are close to the user, as shown in block 206.

Figure 3:
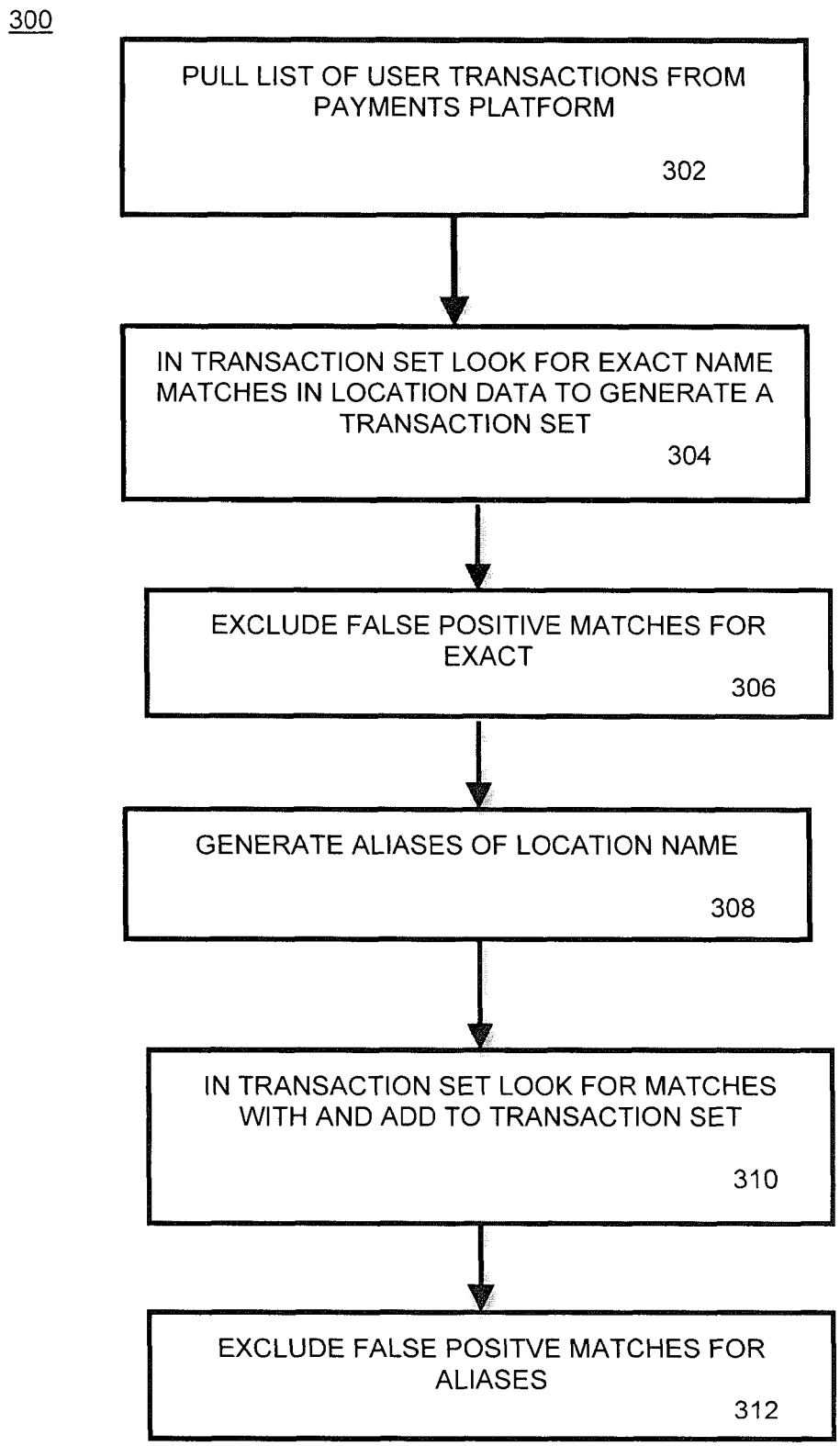
FIG. 3 is a flowchart that illustrates a transaction matching process under an embodiment.

FIG. 3 is a flowchart that illustrates a transaction matching process under an embodiment. This figure shows in greater detail certain acts or process steps associated with block 202 of FIG. 2. The transaction matching process is typically a background task performed by the matching process 118 on a non-real time basis. Transaction process 300 begins by pulling in a list of user transaction from one or more payment methods (e.g., credit card, debit card, phone payments) via payment server 104 or a particular payments integration service (e.g., Yodlee). This step may be performed by a direct data pull from a bank or user load via file. As shown in block 304, in the transaction set, the process looks for exact name matches in location/"place" data of the transaction set. This matching algorithm works by looking for location name substrings in the transaction data title and description. Narrowing options include city as well as zip code when such data is provided from the transaction platform. The process is configured to exclude known "false positive" matches, block 306.

To ensure that as many valid locations as possible are obtained for matching against the transaction history, the possible aliases for matched retailers is also processed. Thus, in block 308, the matching process 118 pulls a list of location aliases. Location aliases comprise variations of a vendor or business name and may be well-known variations or coded variations used by one or more entities, such as payments platforms, banks, search engines, online directories, and so on. A place may have many variations on a name. For example, the well-known coffee shop Starbucks®, may also be known as SBUX, Starbcks, Strcbks, and so on. The alias list may be generated by the matching server 108 personnel or it may be derived from publicly available lists of aliases and name variations for businesses. Once the aliases are generated, the matching algorithm is repeated against the transaction set, block 310. Any false positives for these alias matches are then excluded to obtain a valid list of matched vendor transactions.

In an embodiment, the transaction matching process 300 is repeated for organization/"company". In general, an organization is collection of locations, and can be any grouping based on locale, regions, or any other appropriate characteristic.

Below is an example portion of program code (pseudo code) for the transaction-place matching process, under an embodiment. It should be noted that this code segment is provided for sake of illustration and as an example of possible program code that implements aspects of one or more embodiments.

```
-- Look for a place match
TransactionSet[ ] matchedTransactions = empty
Get Place[ ] p1 by name
For (n=0;n<p.size(0;n++) {
    Get transaction {set}
    Where t.description.contains(pl[n].name)
    Exclude FalsePositives
    matchedTransactions.add (this)
}
Get Place[ ] p2 by alias
For (n=0;n<p.size(0;n++){
    Get transaction {set}
    Where t.description.contains (p2[n].alias)
    Exclude FalsePositives
    matchedTransactions.add (this)
}
```

As shown in FIG. 2, the matching process 118 includes a process that searches for offers from retailers and matches these offers to retailers in the immediate vicinity of the user and the transaction history of the user, blocks 208-210. In an embodiment, this offer matching process involves importing one or more offer sets from different possible sources and displaying these offer sets as an ordered offer list on the user's client device. These different possible sources of offers include information provided by retailers themselves or from third parties. For example, offers could be obtained from web pages accessed by web crawlers and APIs (application program interfaces), or by accessing a publisher that makes such offers available, or through offers that are manually input into the system. The offer matching process looks for exact name matches on street address or phone number in the location/"place" data of the transaction set obtained by the process in block 202 from the payments platform. The location/"place" data may consist of the following fields, among other relevant data:

|Business Name|Address|Phone|URL|.

This location/"place" data can be either stored in local data storage 128 coupled to the matching server 108 or it may be stored and provided by a third party provider of business address information. In an embodiment, the matching process is a cascading process that starts by looking for exact word-to-word matches. If an exact word match to at least the business name is obtained, then this may be marked as a matched offer. To obtain a greater degree of confidence in a potential match, a secondary match is required. In this case, the process obtains corroboration by looking a "fuzzy" matching using NGram algorithms. NGram variations may be provided by third party provider, such as Google, which publishes an NGram set for public use. If there is a sufficiently large "word" match in the street address the process looks for one of the following additional matches: exact phone match, fuzzy name match, or exact website URL match.

Provided below is an example section of program pseudo code that implements an aspect of the offer matching process, under an embodiment. It should be noted that this code segment is provided for sake of illustration and as an example of possible program code that implements aspects of one or more embodiments.

```
Look for a place match
Imported OfferSet[ ] newOffersToLoad
For(int n=0;n<newOffers.size( );n++) {
Search db.place for newOffers[n].streetaddress
If no match yet and
    Fuzzy (Search db.place for newOffers[n].streetaddress = true
Then
    Search db.place for newOffers[n].phone Or
    Fuzzy (Search db.place for newOffers[n].name) Or
    Search db.place for newOffers[n].url
If match found
    Add offer match to place
}
```

In an embodiment, the matching process 118 includes a web crawler process that automatically browses the web on a defined schedule to identify and index offer sites. In an embodiment, the web crawler is embodied in a script that parses HTML code of the sites to look for certain attributes associated with offer sites. Provided below is an example section of program pseudo code for crawling for offer sites.

```
--- sample crawl website xyz.com
Define ( ) columns for data pull //not all sites have all data
available
Load ( ) the website html
Parse syntax ( ) into structured chunks[ ]
For (int n=0;n<chunks.size( );n++){
    Set column [1] = chunk[ 1]
    Set column [2] = chunk[2]
Send file to database loadProcess ( )
```

Offers that are match the required location and transaction criteria are then compiled into an offer list for display or transmission to the user. Any number of offers may be listed as long as they are from vendors within a defined distance of the user and are from vendors that have a transaction history with the user. One or more parameters may be used to limit the size of the offer list. In a default setting, all current offers from vendors with whom the user has a prior transaction may be listed. This default offer list may be limited through filters based on location and/or transaction history. For example, the offer list may further be limited to vendors who within a defined distance (relatively close) to the user at a particular time, and/or with whom the user has had a minimum number of transactions with (e.g., at least three previous visits). The offer list may also be sorted based on different parameters. For example, a default sort order is based on distance of retailer to user. Alternatively, the offer list may be sorted on the basis of number of previous transactions, and so on.

Figure 4:
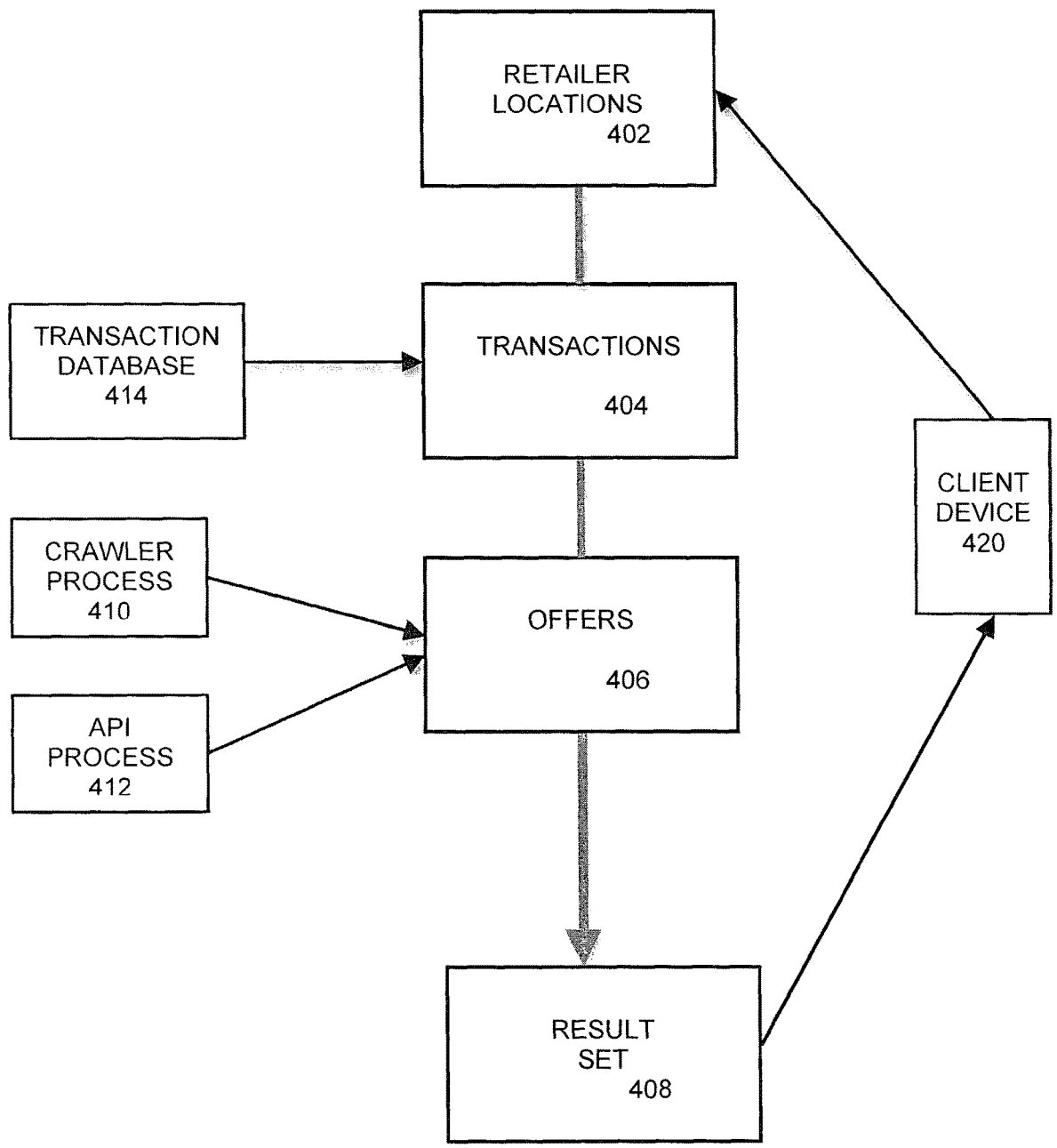
FIG. 4 is a block diagram illustrated the components involved in generating offers in a result set for serving to a user mobile device, under an embodiment.

FIG. 4 is a block diagram illustrated the components involved in generating offers in a result set for serving to a user mobile device, under an embodiment. As shown in FIG. 4, the result set 408 listing offers for vendors in the vicinity of the user that is sent to the user client device 420 is generated by the retailer locations 402, transaction history information 404 and offers 406 that are generated and processed by the matching process 118. The matching process 118 takes the user location provided by the geolocation capabilities of client device 420 to derive a list of retailers that are in the vicinity of the user. The retailer locations use this location information along with transactions 404 provided in transaction histories that are accessed from the transaction database 414 of the payments platform. The current offers 406 from any of these retailers are found by a crawler process 410 or an API process 412 executed in the matching process 118. In a standard implementation, the location determination function 402 and the offer determination function 406 are performed in a real-time context triggered by location updates by the client device. The transaction determination function 404 is generally performed as an offline process on a periodic and non-real-time basis.

Figure 5A:
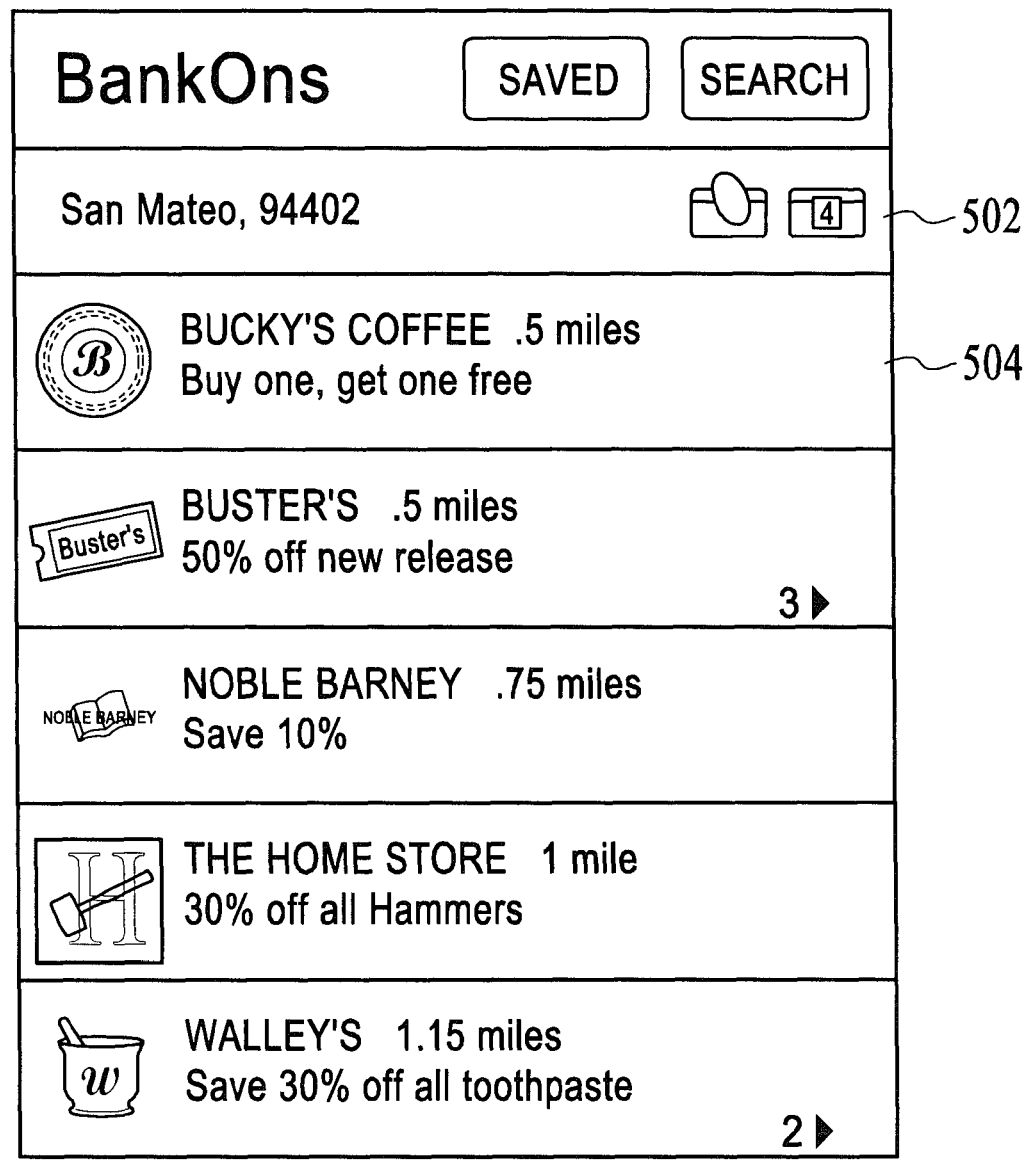
FIG. 5A illustrates an example display of matched offers based on a user's location and transaction history, under an embodiment.
Figure 5B:
FIG. 5B illustrates a GUI display area listing matched offers in conjunction with graphical directional markers, under an embodiment.

The result set 408 that embodies the listed offers that is served to the user client device 102 from matching server 108 is typically displayed through a graphical user interface (GUI) displayed on the client mobile device 102. FIG. 5A illustrates an example display of matched offers based on a user's location and transaction history, under an embodiment. The main GUI display area 500 includes a number of separate display elements that can include a current location of the user 502, along with other information, such as time, user name, and so on. The display window also lists a number of matched offers 504 listing the vendor and any offer messages provided by the vendor. These listed offers represent the offers matched to the user's present location and past transactions with these vendors. The individual offer display areas may include items related to the offer, such as vendor name, logo, address, and the like, along with the ad or coupon message. The offer display can also indicate the approximate distance between the user and the vendor, along with a directional indicator (e.g., compass) that shows the direction to the user. Other graphical elements pertaining to location or direction can also be included. FIG. 5B illustrates a GUI display area listing matched offers in conjunction with graphical directional markers 510, under an embodiment.

Figure 5C:
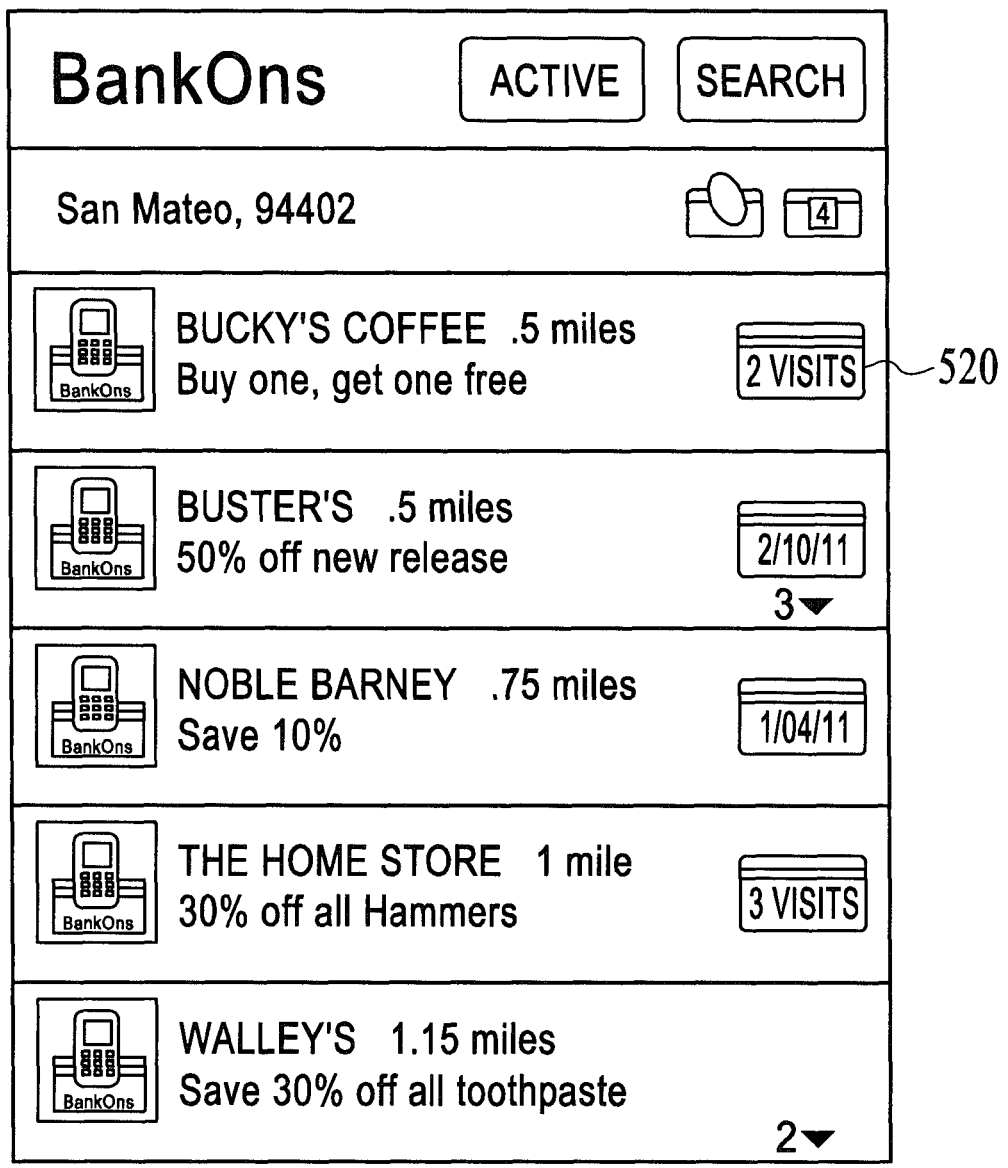
FIG. 5C illustrates a GUI display area listing matched offers in conjunction with previous transaction information, under an embodiment.

Since the displayed offers are matched to a user based on his or her previous transactions with a vendor, the display area can also be configured to display information related to these previous transactions. FIG. 5C illustrates a GUI display area listing matched offers in conjunction with previous transaction information, under an embodiment. As shown in FIG. SC, each display area includes a smaller display area 520 that contains some type of information related to the previous visit or visits to the vendor. This can include the number of times or dates of previous visits, and so on. This display area can also represent a link to a further display area that provides more detailed information about the previous transactions, such as items purchased, amount spent, and other similar information.

The number of offers displayed at any one time can be limited by a pre-set number, or all possible offers may be displayed. The display of multiple offers is typically constrained by the size and processing capabilities of the mobile client device, and standard scrolling or page swap mechanisms may be employed to display multiple pages of offers on the device.

Figure 6A:
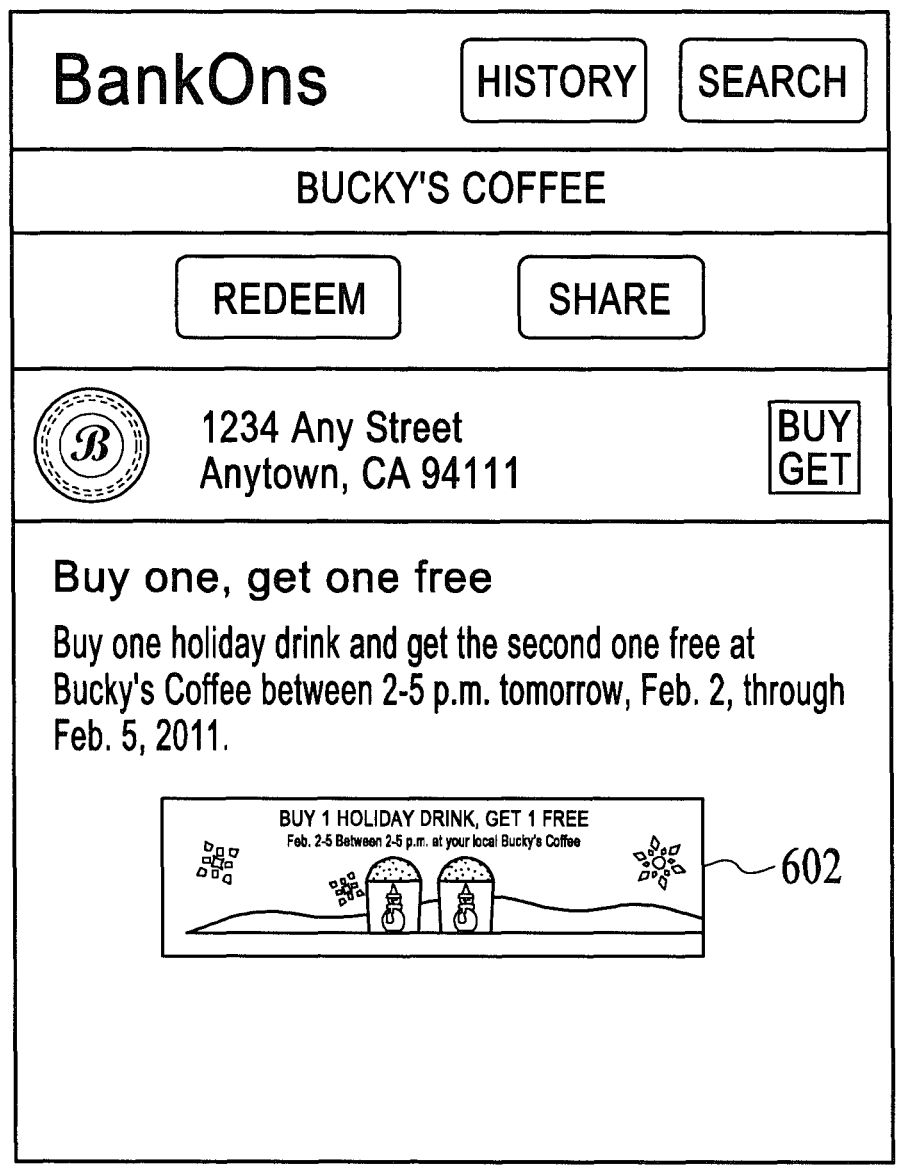
FIG. 6A illustrates a coupon display area for a specific displayed offer under an embodiment.
Figure 6B:
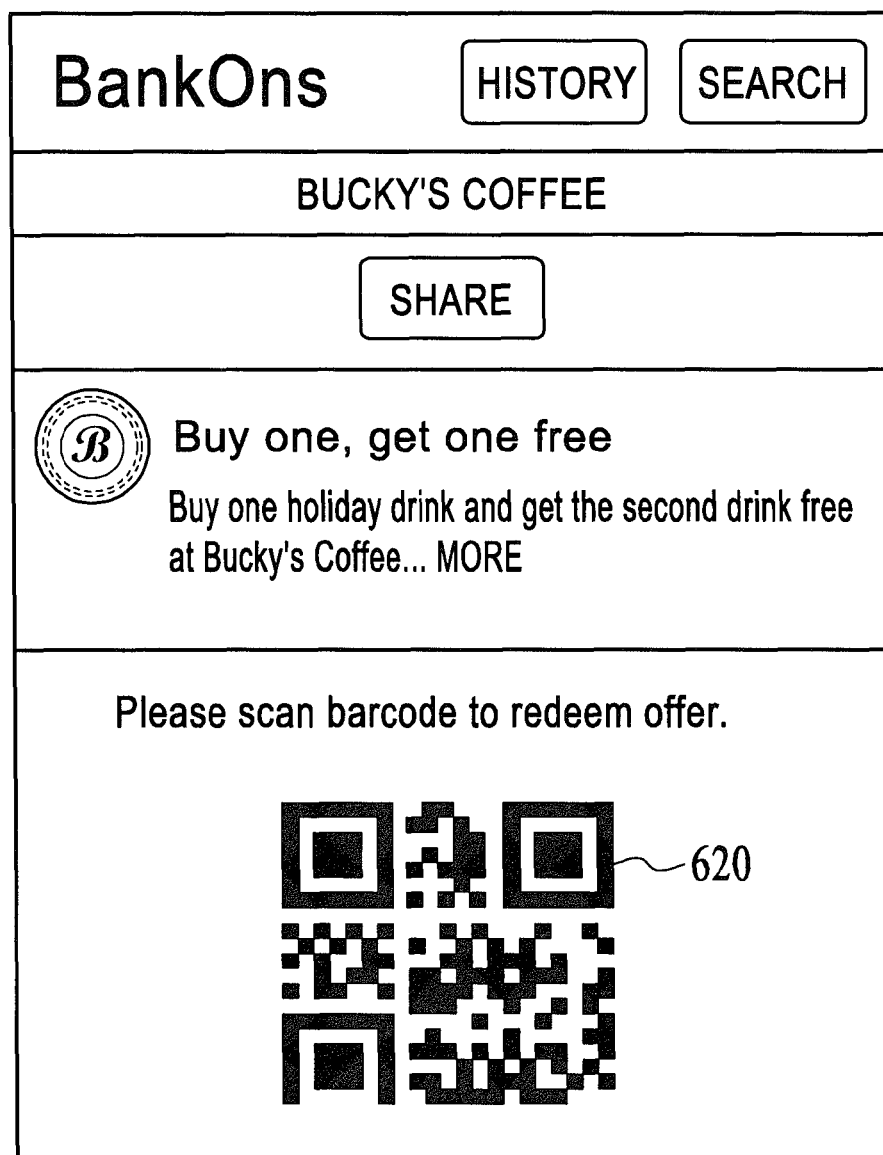
FIG. 6B illustrates a coupon display area for a specific displayed offer under an alternative embodiment.
Figure 6C:
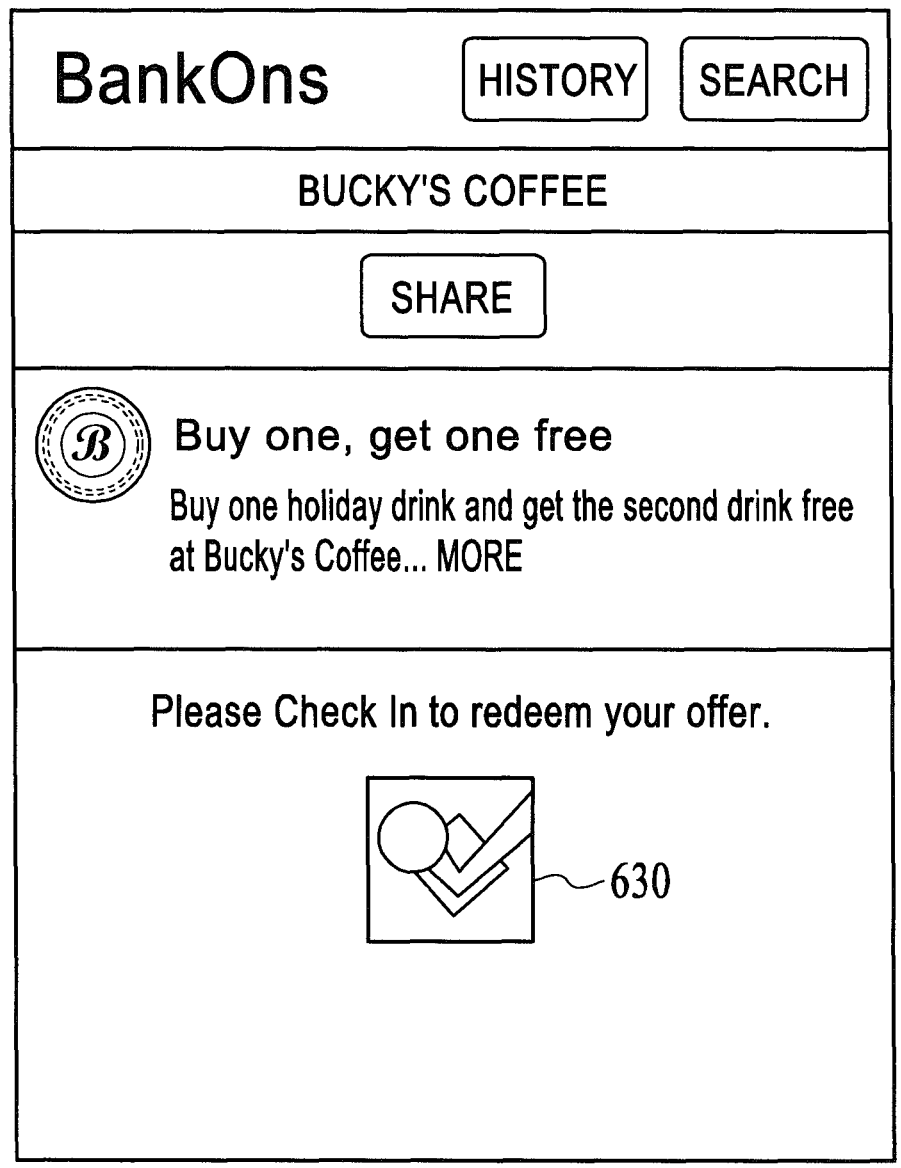
FIG. 6C illustrates a coupon display area for a specific displayed offer under a further alternative embodiment.

In an embodiment, each separate offer display window represents a dynamic link to a second display area that displays the actual coupon or message for printing or showing to the vendor. Through the mobile device user interface, a user typically accesses this coupon display area by clicking on or otherwise activating the offer display area. FIG. 6A illustrates a coupon display area for a specific displayed offer under an embodiment. For the embodiment illustrated in FIG. 6A, the coupon display includes a graphical representation or drawing of an actual paper coupon 602 that may have been issued by the vendor. Such a coupon provides information regarding redeeming the coupon (i.e., when, where and how) and can be printed or shown to the vendor for redemption. In certain cases, an electronic coupon may be embodied in a manner that allows direct interaction between the mobile client device and a point of sale terminal, such as a register, kiosk, or other device. FIG. 6B illustrates a coupon display area for a specific displayed offer under an alternative embodiment, in which the coupon display area 620 includes barcode pattern that can be scanned by the vendor to evidence the coupon value at the point of sale. In certain cases, a coupon or promotion may be accessed by the user registering with the vendor. This typically eliminates the need for a user to print or display an individual coupon. FIG. 6C illustrates a coupon display area for a specific displayed offer under a further alternative embodiment, in which the coupon display area provides a link 630 to a registration page that allows the user to directly redeem the coupon or register with the vendor so that the coupon or discount value is honored when the user visits the retailer.

Figure 7A:
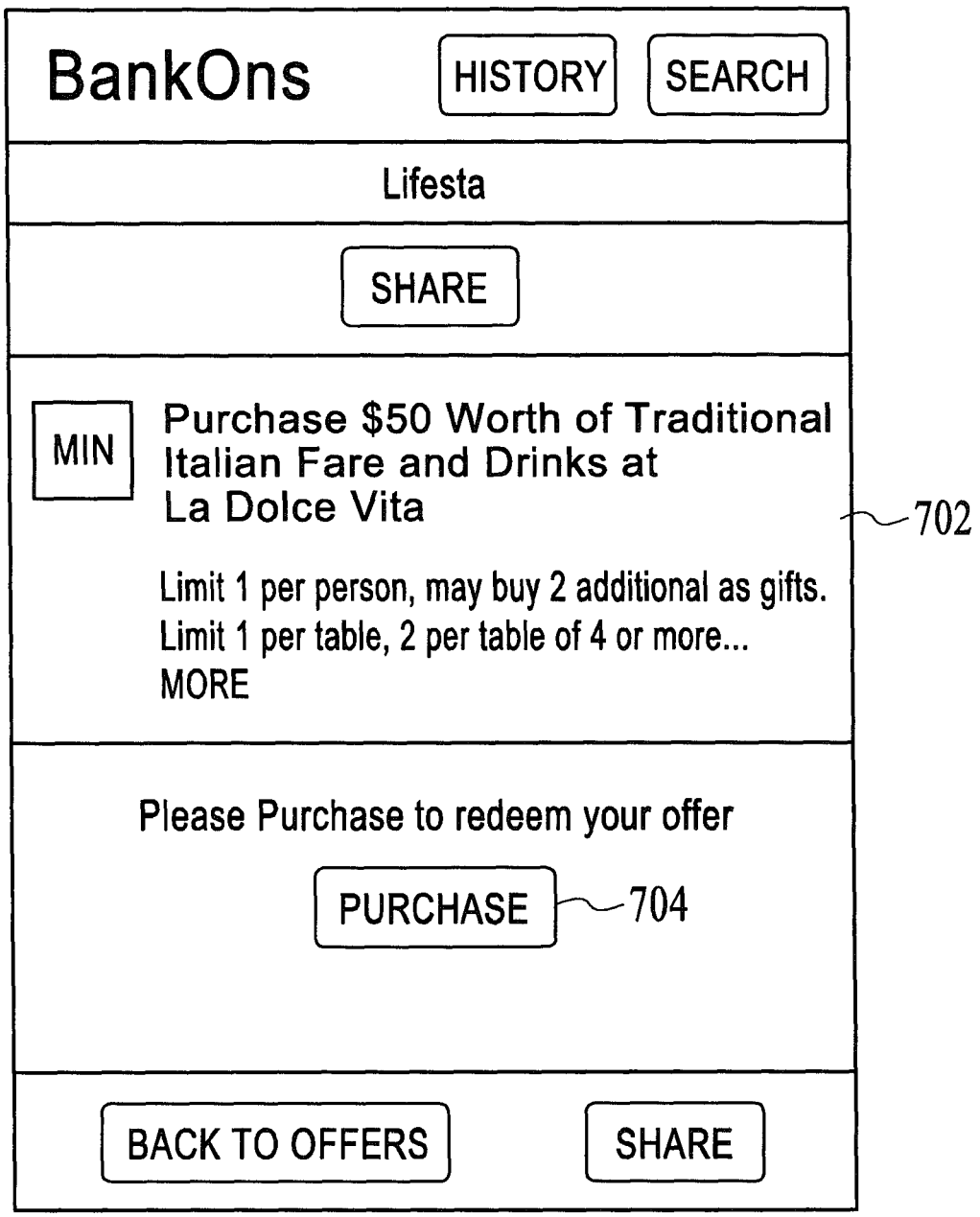
FIG. 7A illustrates an example electronic certificate displayed through a mobile client device, under an embodiment.
Figure 7B:
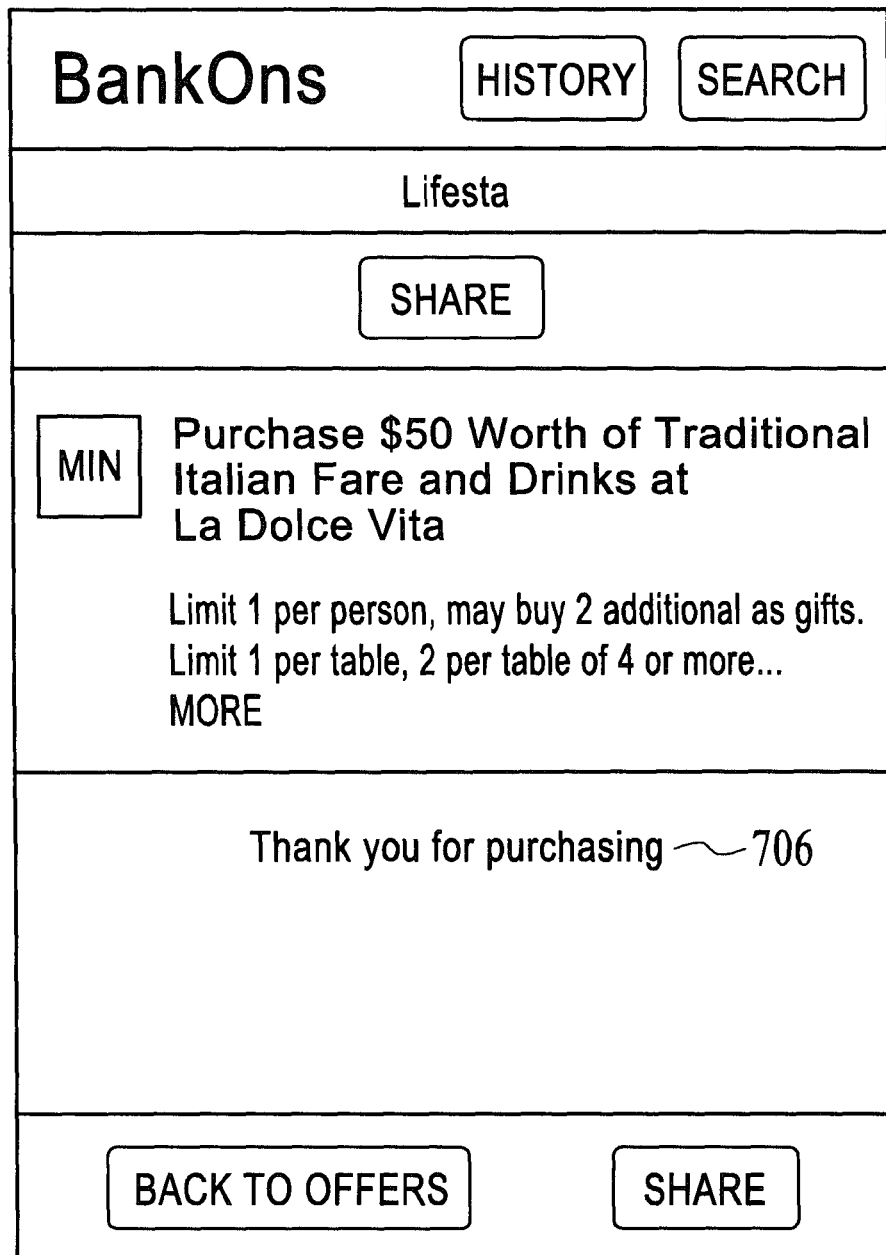
FIG. 7B illustrates an example acknowledgment screen displayed through a mobile client device after redemption of an electronic certificate, under an embodiment.

In an embodiment, the matching process 118 may be implemented as an in-application process that is executed on the mobile client device 102. In this embodiment, after the matching process displays the list of matched offers, such as shown in FIG. 5B, it transfers funds to an appropriate account tied to the mobile device 102 and generates an electronic certificate for the user to redeem directly at the POS terminal of the retailer. FIG. 7A illustrates an example electronic certificate displayed through a mobile client device, under an embodiment. As shown in FIG. 7A, for an in-app embodiment, an electronic certificate is displayed in display area 702 of the client device. Such an electronic certificate may be redeemed directly by the user selecting the appropriate selection command button 704 displayed on the client device. In this case, the certificate represents the purchase or pre-purchase of goods or services provided by the user. A payment account maintained or coordinated by the client device service provider (e.g., WSP 107) may be used to facilitate the transfer of funds between the user payment account and the retailer. In an embodiment, the client device may be an NFC device that enables mobile payments. Once the user has elected to purchase the offered goods or services using the electronic certificate, an acknowledgement message is generated and displayed on the client device. FIG. 7B illustrates an example acknowledgment screen displayed through a mobile client device after redemption of an electronic certificate, under an embodiment. The acknowledgement message may be a thank you notice 706 displayed on the client device, as shown in FIG. 7B.

It should be noted that the GUI display pages of FIGS. 5A-C, 6A-C, and 7A-B are provided as example pages and many alternative display configurations and redemption methods are possible.

Embodiments of the matching process 118 may be performed by or in conjunction with certain service providers for the user in network environment 100, such as WSP 107 or an ISP or similar service provider. Certain mechanisms may be included in conjunction with the matching process to ensure adequate user privacy requirements. In an embodiment, a user can be allowed to opt-out of the matching process or on any individual element thereof. Likewise, system access to certain items of user information, such as exact present location and/or financial transaction data may be subject to specific access limitations It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
identifying, by a processor, a vendor who has transacted with a user;
determining, by the processor, at least one location associated with the vendor;
determining, by the processor, a current device location of a computing device associated with the user;
determining a motion characteristic of the user based on a speed that the computing device is traveling via global positioning satellite (GPS) data;
determining, by the processor, a proximity based on the motion characteristic;
determining, by the processor, that the at least one location is within the proximity of the current device location; and
generating, by the processor, a current promotion offer associated with the vendor.

2. The method of claim 1, wherein the proximity is further based on a population density measurement associated with the current device location.

3. The method of claim 1, further comprising:
identifying, by the processor, at least one current promotion offered by the vendor,
wherein the current promotion offer comprises information related to the at least one current promotion offered by the vendor.

4. The method of claim 1, wherein identifying the vendor is based on a transaction history of the user, and wherein the transaction history comprises one of a card-based payment history through a credit or debit card used by the user, and a mobile payment history using a near field communication (NFC) device.

5. The method of claim 1, wherein identifying the vendor is based on a transaction history of the user, and wherein the transaction history comprises a purchase transaction history of the user based on previous purchase transactions, and wherein the previous purchase transactions comprise one or more particular purchase transactions with one or more specific vendors.

6. The method of claim 1, wherein identifying the vendor who has transacted with the user comprises:
performing a search, by the processor, for a name of the vendor in a transaction history of the user based on first word matching;
excluding, by the processor, known false positive matches resulting from the search;
generating, by the processor, alias variations for the name of the vendor;
performing, by the processor, a second search for the alias variations using second word matching; and
excluding, by the processor, false positive matches resulting from the second search.

7. The method of claim 1, further comprising:
generating display data for displaying a location indicator icon in conjunction with a list of current promotions to indicate a relative direction of a corresponding vendor to the user.

8. The method of claim 1, wherein the current promotion offer is embodied in at least one of an electronic coupon redeemable by the user at the location associated with the vendor within the proximity of the user, and an advertising message indicating a promotion available to the user by visiting the location associated with the vendor within the proximity of the user.

9. A non-transitory computer-readable medium configured to store instructions that, when executed by at least one processor, cause the at least one processor to perform a method, the method comprising:
identifying a vendor who has transacted with a user;
determining at least one location associated with the vendor;
determining a current device location of a computing device associated with the user;
determining a motion characteristic of the user based on a speed that the computing device is traveling via global positioning satellite (GPS) data;
determining a first proximity based on the motion characteristic;
determining that the at least one location is within the first proximity of the current device location; and
generating a current promotion offer associated with the vendor.

10. The non-transitory computer-readable medium of claim 9, wherein generating the current promotion offer comprises:
executing a web crawler process to search for promotions offered by vendors;
determining that at least one promotion found by the web crawler process matches the vendor;
determining whether an address element associated with the vendor is a word-to-word match of an address element in the at least one promotion; and
responsive to determining that the address element associated with the vendor is a word-to-word match of the address element in the at least one promotion, determining, based on a comparison of an additional vendor element associated with the vendor to an additional vendor element in the at least one promotion, a secondary match of the at least one promotion offered by the vendor,
wherein determining the secondary match comprises determining a fuzzy match based on a comparison of an additional vendor element associated with the vendor to an additional vendor element in the at least one promotion.

11. The non-transitory computer-readable medium of claim 9, wherein the current device location of the computing device is indicated by location data received from at least one of a geolocating component within the computing device, and a wireless service provider that locates a user relative to one or more physical sites maintained by the wireless service provider,
wherein generating the current promotion offer comprises:
obtaining the current device location of the computing device in latitude/longitude format;
obtaining the at least one location of the vendor in street address format; and
converting the street address format to a corresponding latitude/longitude format for direct comparison with the current device location of the computing device.

12. The non-transitory computer-readable medium of claim 9, wherein generating the current promotion offer comprises executing an application program interface (API) program configured to search for offers from a matched vendor.

13. The non-transitory computer-readable medium of claim 9, wherein the first proximity is further based on a population density measurement associated with the current device location.

14. The non-transitory computer-readable medium of claim 9, wherein the method further comprises:
identifying at least one current promotion offered by the vendor,
wherein the current promotion offer comprises information related to the at least one current promotion offered by the vendor.

15. The non-transitory computer-readable medium of claim 9, wherein identifying the vendor is based on a transaction history of the user, and wherein the transaction history comprises one of a card-based payment history through a credit or debit card used by the user, and a mobile payment history using a near field communication (NFC) device.

16. A system comprising:
one or more processors; and
a memory in communication with the one or more processors comprising instructions that, when executed by the one or more processors, are configured to cause the system to:
identify a vendor who has transacted with a user;
determine at least one location associated with the vendor;
determine a current device location of a computing device associated with the user;
determine a motion characteristic of the user based on a speed that the computing device is traveling via global positioning satellite (GPS) data;
determine a proximity based on the motion characteristic;
determine that the at least one location is within the proximity of the current device location; and
generate a current promotion offer associated with the vendor.

17. The system of claim 16, wherein identifying the vendor who has transacted with the user comprises:
performing a search for a name of the vendor in a transaction history of the user based on first word matching;
excluding known false positive matches resulting from the search;
generating alias variations for the name of the vendor;
performing a second search for the alias variations using second word matching; and
excluding false positive matches resulting from the second search.

18. The system of claim 16, wherein the instructions are further configured to cause the system to:
generate display data for displaying a location indicator icon in conjunction with a list of current promotions to indicate a relative direction of a corresponding vendor to the user.

19. The system of claim 16, wherein the current promotion offer is embodied in at least one of an electronic coupon redeemable by the user at the location associated with the vendor within the proximity of the user, and an advertising message indicating a promotion available to the user by visiting the location associated with the vendor within the proximity of the user.

20. The system of claim 16, wherein the proximity is further based on a population density measurement associated with the current device location.

* * * * *